(12) United States Patent
Umemura et al.

(10) Patent No.: US 11,608,923 B2
(45) Date of Patent: Mar. 21, 2023

(54) FLUID LOADING JOINT

(71) Applicants: KAWASAKI JUKOGYO KABUSHIKI KAISHA, Kobe (JP); TB GLOBAL TECHNOLOGIES LTD., Tokyo (JP); T.EN LOADING SYSTEMS S.A.S., Sens (FR)

(72) Inventors: Tomoaki Umemura, Kobe (JP); Tsutomu Kawai, Nagaoka (JP)

(73) Assignees: KAWASAKI JUKOGYO KABUSHIKI KAISHA, Kobe (JP); TB GLOBAL TECHNOLOGIES LTD., Tokyo (JP); T.EN LOADING SYSTEMS S.A.S., Sens (FR)

( * ) Notice: Subject to any disclaimer, the term of this patent is extended or adjusted under 35 U.S.C. 154(b) by 258 days.

(21) Appl. No.: 16/958,816

(22) PCT Filed: Dec. 26, 2018

(86) PCT No.: PCT/JP2018/047907
§ 371 (c)(1),
(2) Date: Jun. 29, 2020

(87) PCT Pub. No.: WO2019/131784
PCT Pub. Date: Jul. 4, 2019

(65) Prior Publication Data
US 2021/0071795 A1    Mar. 11, 2021

(30) Foreign Application Priority Data
Dec. 28, 2017 (JP) .............................. JP2017-254140

(51) Int. Cl.
*F16L 39/04*    (2006.01)
*F16L 27/08*    (2006.01)
(Continued)

(52) U.S. Cl.
CPC ................ *F16L 39/04* (2013.01); *B67D 9/00* (2013.01); *F16L 27/0828* (2013.01); *F16L 59/065* (2013.01); *F17C 2221/012* (2013.01)

(58) Field of Classification Search
CPC ....... F16L 39/04; F16L 39/06; F16L 37/0828; F16L 25/02; F16L 59/075; F16L 25/026; F16L 27/087; F16L 23/02
See application file for complete search history.

(56) References Cited

U.S. PATENT DOCUMENTS

| 236,519 | A | * | 1/1881 | Walsh | ..................... F16L 39/06 285/356 |
| 2,877,026 | A | * | 3/1959 | Payne | ..................... F16L 39/04 277/408 |

(Continued)

FOREIGN PATENT DOCUMENTS

| DE | 3819390 A1 | * | 12/1989 | ............ F16L 27/087 |
| JP | 2004084691 A | * | 3/2004 | ......... F16L 27/0828 |
| JP | 2017-019531 A | | 1/2017 | |

*Primary Examiner* — Zachary T Dragicevich
*Assistant Examiner* — Fannie C Kee
(74) *Attorney, Agent, or Firm* — Oliff PLC (57) ABSTRACT

A fluid loading joint for rotatably connecting double pipes to each other includes: a first half including a first inner pipe, a first outer pipe, and a holder, the first inner pipe being provided with a first flange, the first outer pipe accommodating the first inner pipe therein, the holder holding the first outer pipe such that the first outer pipe is rotatable; a second half including a sliding surface facing the first flange, the second half including a second inner pipe and a second outer pipe, the second inner pipe being provided with a second flange, the second outer pipe accommodating the second (Continued)

inner pipe therein and being provided with an outer flange that is fastened to the holder; an inner sealing member and an outer sealing member that are disposed between the first flange and the sliding surface; an inner passage provided in the second flange, the inner passage leading a leaked fluid from between the inner sealing member and the outer sealing member to an outer circumferential surface of the second flange; an outer passage provided in the outer flange, the outer passage leading the leaked fluid from an inner side to an outer side of the second outer pipe; and a leakage pipe that connects the inner passage and the outer passage between the second flange and the outer flange.

4 Claims, 5 Drawing Sheets

(51) Int. Cl.
*B67D 9/00* (2010.01)
*F16L 59/065* (2006.01)

(56) References Cited

U.S. PATENT DOCUMENTS

| | | | | | |
|---|---|---|---|---|---|
| 2,957,709 | A | * | 10/1960 | Skarstrom | F16L 39/04 285/96 |
| 3,020,057 | A | * | 2/1962 | Gamet | F16L 39/04 279/4.12 |
| 3,180,661 | A | * | 4/1965 | Porath | F16L 39/04 285/93 |
| 3,923,133 | A | * | 12/1975 | Chivari | F16L 27/087 416/157 R |
| 4,040,338 | A | * | 8/1977 | Wilson | F16L 39/04 91/1 |
| 4,325,540 | A | * | 4/1982 | Seki | F16L 39/04 266/245 |
| 5,199,748 | A | * | 4/1993 | Jung | F16L 27/087 285/121.5 |
| 6,186,509 | B1 | * | 2/2001 | Wada | F16L 39/04 277/363 |
| 8,113,545 | B2 | * | 2/2012 | Takahashi | F16L 27/087 277/408 |
| 2018/0187821 | A1 | * | 7/2018 | Takami | F16L 27/0828 |
| 2019/0107236 | A1 | * | 4/2019 | Petrou | F16L 39/04 |

* cited by examiner

FLUID LOADING JOINT

TECHNICAL FIELD

The present invention relates to a fluid loading joint intended for a low-temperature fluid and capable of rotatably connecting double pipes to each other.

BACKGROUND ART

Figure 5:
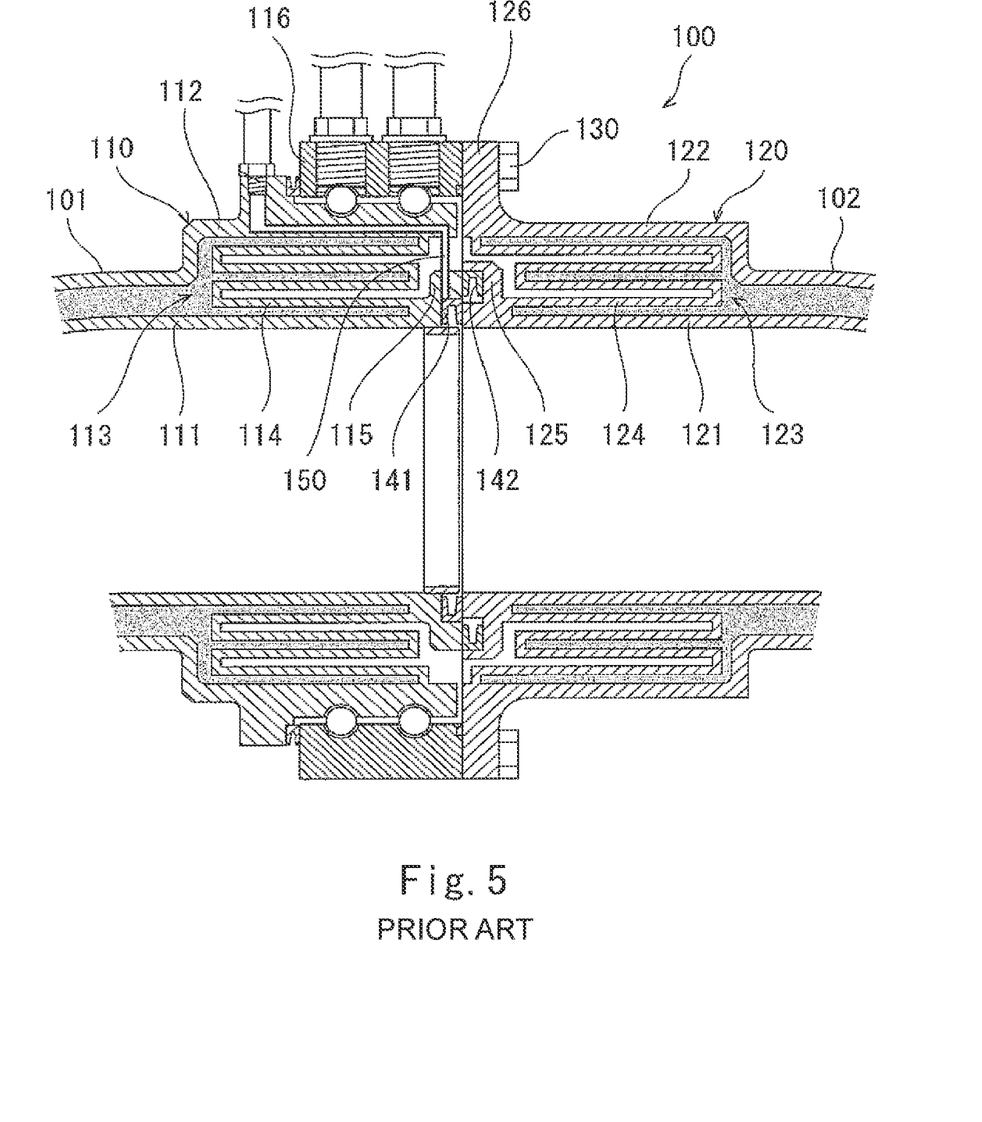
FIG. 5 is a sectional view of a conventional fluid loading joint.

There are cases where fluid loading equipment (a loading arm) intended for a low-temperature fluid, which is installed at, for example, a harbor or port, incorporates therein a fluid loading joint that rotatably connects double pipes to each other. For example, Patent Literature 1 discloses a fluid loading joint 100 as shown in FIG. 5, which is intended for liquefied hydrogen and connects vacuum double pipes to each other.

Specifically, the fluid loading joint 100 includes a first half 110, which is a movable side of the joint, and a second half 120, which is a fixed side of the joint. The first half 110 is provided at an end of a first vacuum double pipe 101, and the second half 120 is provided at an end of a second vacuum double pipe 102. The first half 110 includes a first inner pipe 111 and a first outer pipe 112. The first outer pipe 112 accommodates the first inner pipe 111 therein. The second half 120 includes a second inner pipe 121 and a second outer pipe 122. The second outer pipe 122 accommodates the second inner pipe 121 therein.

A first vacuum space 113 is formed between the first inner pipe 111 and the first outer pipe 112, and a first blocking member 114 blocks between the first inner pipe 111 and the first outer pipe 112. Similarly, a second vacuum space 123 is formed between the second inner pipe 121 and the second outer pipe 122, and a second blocking member 124 blocks between the second inner pipe 121 and the second outer pipe 122.

The first half 110 includes a holder 116, which holds the first outer pipe 112 via bearings, such that the first outer pipe 112 is rotatable. An outer flange 126 is provided at the distal end of the second outer pipe 122, and the outer flange 126 is fastened to the holder 116 by bolts 130.

A first flange 115 is provided at the distal end of the first inner pipe 111, and a second flange 125 is provided at the distal end of the second inner pipe 121. The distal end surface of the second flange 125 is a sliding surface facing the first flange 115.

An inner sealing member 141 and an outer sealing member 142 for preventing the liquefied hydrogen from leaking through a gap between the first flange 115 and the second flange 125 are disposed between the first flange 115 and the second flange 125.

The first flange 115 is provided with an inner passage that leads a leaked fluid that has leaked beyond the inner sealing member 141 from between the inner sealing member 141 and the outer sealing member 142 to the outer circumferential surface of the first flange. On the other hand, the first outer pipe 112 is provided with an outer passage that leads the leaked fluid from the inner side to the outer side of the first outer pipe 112. The inner passage and the outer passage are connected by a leakage pipe 150.

CITATION LIST

Patent Literature

PTL 1: Japanese Laid-Open Patent Application Publication No. 2017-19531

SUMMARY OF INVENTION

Technical Problem

However, in a case where the discharge route of the leaked fluid is formed in the movable-side first half 110 as in the fluid loading joint 100 shown in FIG. 5, the structure of the first half 110, which incorporates bearings therein, becomes complex.

In view of the above, an object of the present invention is to provide a fluid loading joint whose first half has a simplified structure.

Solution to Problem

In order to solve the above-described problems, a fluid loading joint according to the present invention is a fluid loading joint for rotatably connecting double pipes to each other, the fluid loading joint including: a first half including a first inner pipe, a first outer pipe, and a holder, the first inner pipe being provided with a first flange, the first outer pipe accommodating the first inner pipe therein, the holder holding the first outer pipe such that the first outer pipe is rotatable; a second half including a sliding surface facing the first flange, the second half including a second inner pipe and a second outer pipe, the second inner pipe being provided with a second flange, the second outer pipe accommodating the second inner pipe therein and being provided with an outer flange that is fastened to the holder; an inner sealing member and an outer sealing member that are disposed between the first flange and the sliding surface; an inner passage provided in the second flange, the inner passage leading a leaked fluid from between the inner sealing member and the outer sealing member to an outer circumferential surface of the second flange; an outer passage provided in the outer flange, the outer passage leading the leaked fluid from an inner side to an outer side of the second outer pipe; and a leakage pipe that connects the inner passage and the outer passage between the second flange and the outer flange.

According to the above configuration, the discharge route of the leaked fluid is formed in the fixed-side second half. This makes it possible to simplify the structure of the movable-side first half, which incorporates bearings therein.

The outer passage may be located at a position that is different from a position of the inner passage in a circumferential direction. The leakage pipe may connect the inner passage and the outer passage while bending. In a case where the fluid flowing through the inside of the first inner pipe and the second inner pipe is a fluid having an extremely low temperature, such as liquefied hydrogen, the first inner pipe and the second inner pipe thermally contract to a great degree. In this respect, according to the above configuration, since the leakage pipe includes bend portions, the thermal contraction of the second inner pipe can be absorbed by bending deformation occurring at the bend portions.

For example, the first half may include a first blocking member that blocks between the first inner pipe and the first outer pipe. The second half may include a second blocking member that blocks between the second inner pipe and the second outer pipe, the second blocking member forming a gas space between the first blocking member and the second blocking member, the gas space being filled with gas. The leakage pipe may be disposed in the gas space.

The second half may include: an annular spacer interposed between the first flange and the second flange and forming the sliding surface; and an annular insulator sandwiched between the spacer and the second flange. The insulator may be provided with a through-hole that communicates with the inner passage. The spacer may be provided with an introduction passage that is open at the sliding surface between the inner sealing member and the outer sealing member, the introduction passage communicating with the through-hole. This configuration makes it possible to electrically insulate between the first flange and the second flange.

Advantageous Effects of Invention

The present invention provides a fluid loading joint whose first half has a simplified structure.

DESCRIPTION OF EMBODIMENTS

Figure 1:
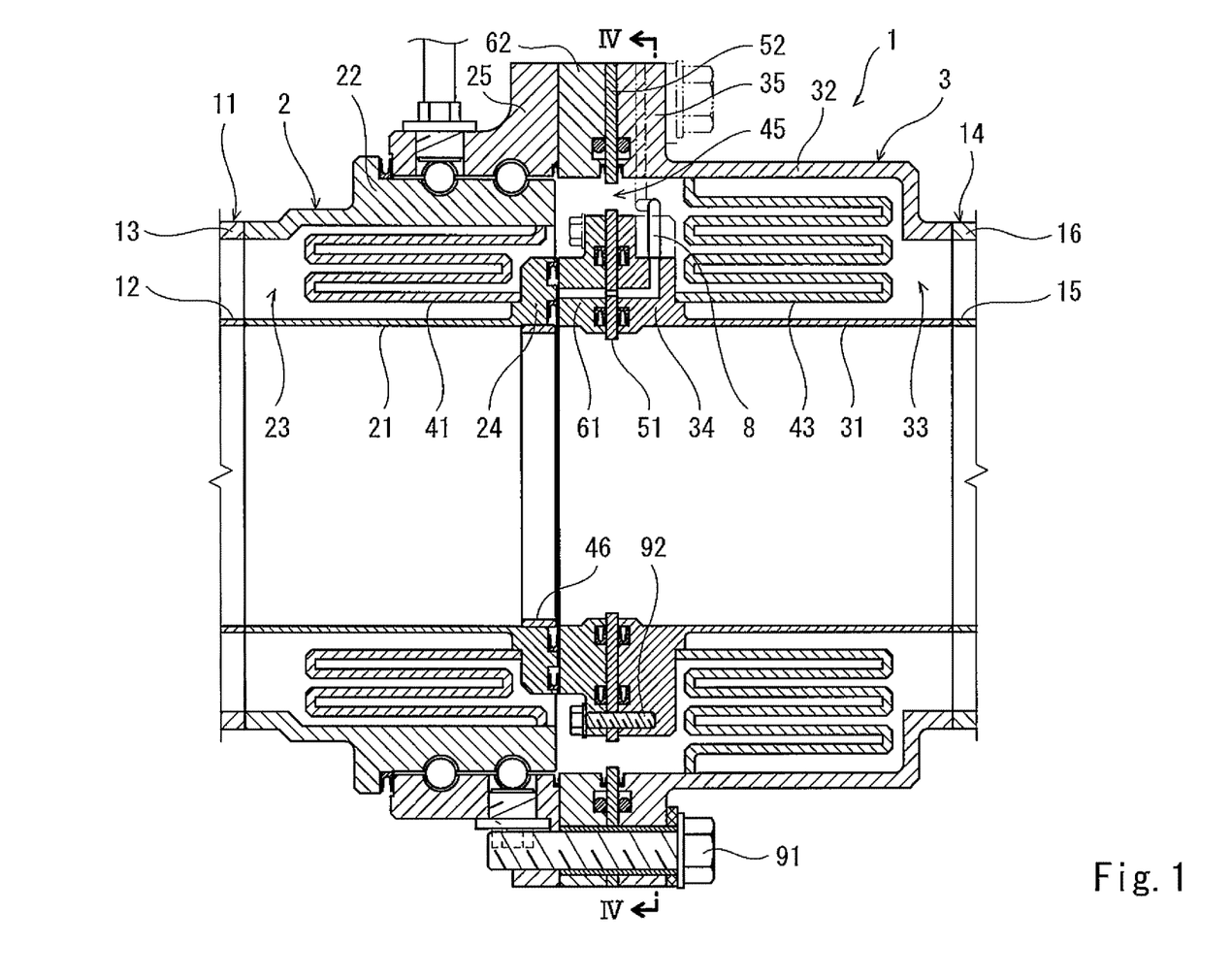
FIG. 1 is a sectional view of a fluid loading joint according to one embodiment of the present invention.
Figure 2:
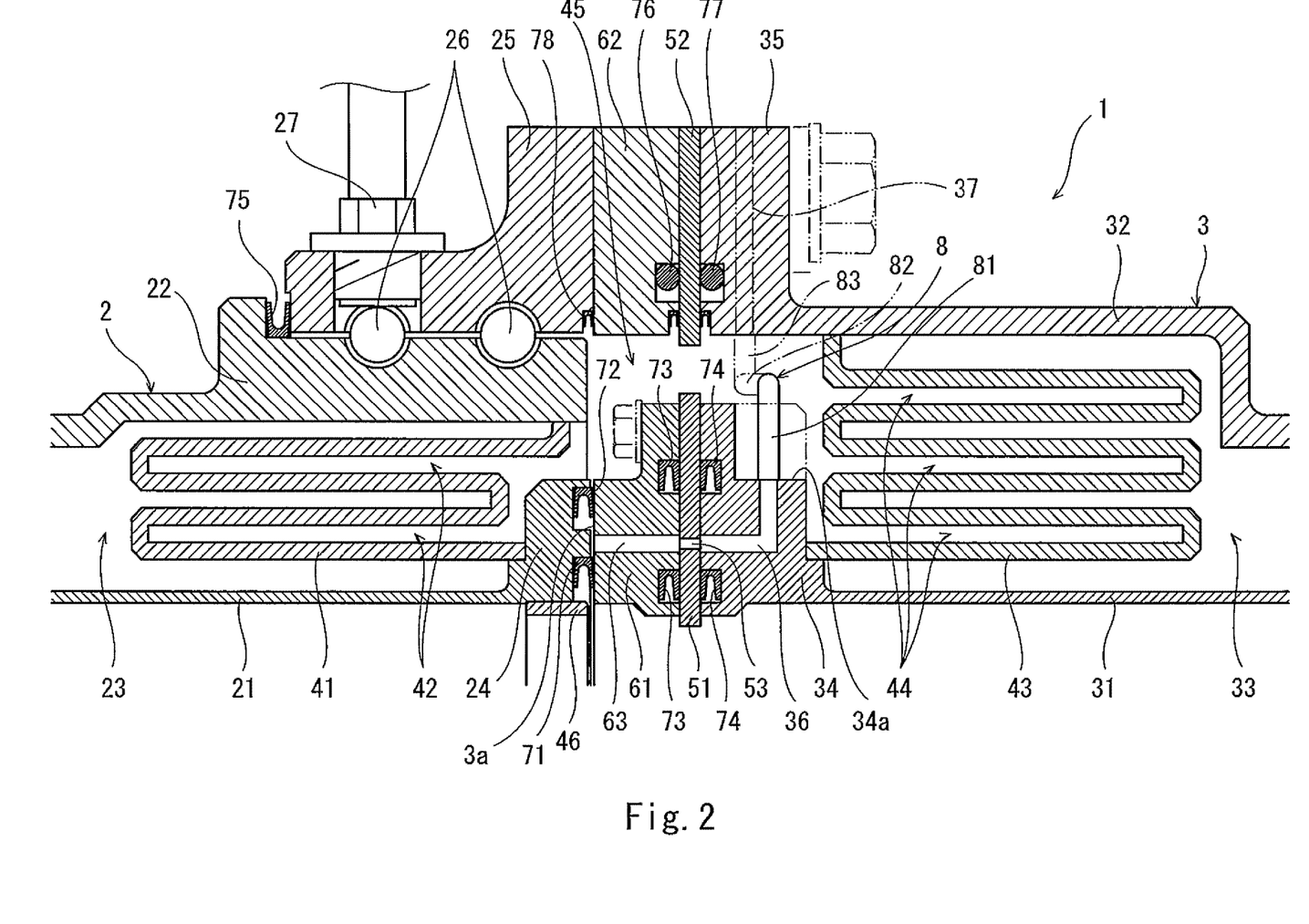
FIG. 2 is an enlarged view of a part of FIG. 1.
Figure 3:
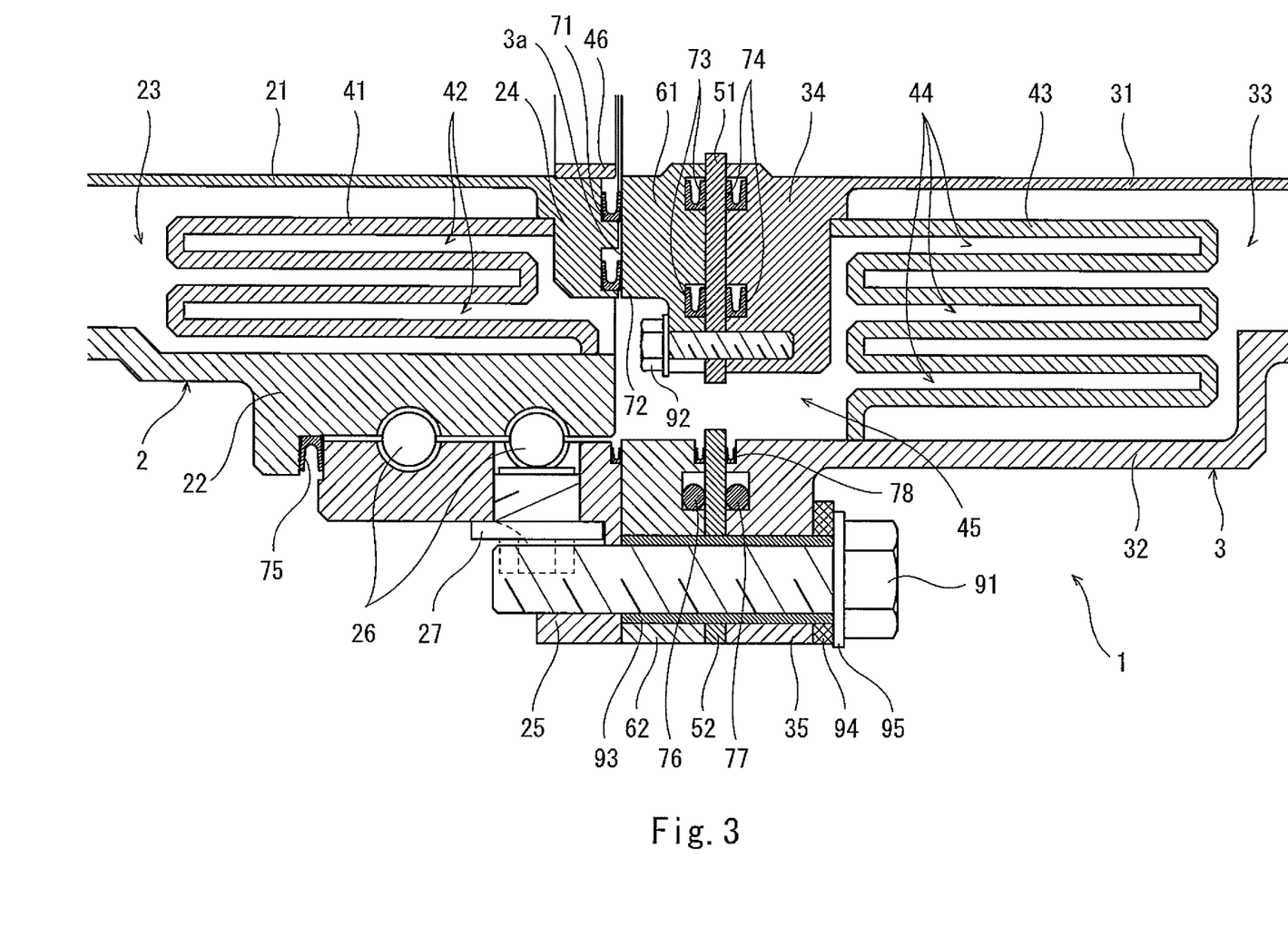
FIG. 3 is an enlarged view of another part of FIG. 1.

FIG. 1 to FIG. 3 show a fluid loading joint 1 intended for a low-temperature fluid according to one embodiment of the present invention. The fluid loading joint 1 is incorporated in fluid loading equipment (a loading arm) that is installed at, for example, a harbor or port and that is connected to, for example, a liquefied gas carrier ship.

In the present embodiment, the low-temperature fluid, for which the fluid loading joint 1 is intended, is liquefied hydrogen. Alternatively, the low-temperature fluid may be a different low-temperature liquid, such as LNG, or may be low-temperature gas.

The fluid loading joint 1 rotatably connects a first vacuum double pipe 11 and a second vacuum double pipe 14 to each other. Specifically, the fluid loading joint 1 includes a first half 2, which is a movable side of the joint, and a second half 3, which is a fixed side of the joint. The first half 2 is provided at an end of the first vacuum double pipe 11. The second half 3 is provided at an end of the second vacuum double pipe 14.

The first vacuum double pipe 11 includes a first conduit pipe 12 and a first accommodating pipe 13. The liquefied hydrogen flows through the inside of the first conduit pipe 12. The first accommodating pipe 13 accommodates the first conduit pipe 12 therein. A vacuum is drawn on the space between the first conduit pipe 12 and the first accommodating pipe 13. Similarly, the second vacuum double pipe 14 includes a second conduit pipe 15 and a second accommodating pipe 16. The liquefied hydrogen flows through the inside of the second conduit pipe 15. The second accommodating pipe 16 accommodates the second conduit pipe 15 therein. A vacuum is drawn on the space between the second conduit pipe 15 and the second accommodating pipe 16.

The first half 2 includes a first inner pipe 21 and a first outer pipe 22. The first outer pipe 22 accommodates the first inner pipe 21 therein. The first conduit pipe 12 is joined, for example by welding, to the proximal end of the first inner pipe 21 (i.e., the opposite end from the second half 3). The first accommodating pipe 13 is joined, for example by welding, to the proximal end of the first outer pipe 22. A first vacuum space 23 is formed between the first inner pipe 21 and the first outer pipe 22. It should be noted that the position of the proximal end of the first inner pipe 21 and the position of the proximal end of the first outer pipe 22 may be shifted from each other in the axial direction.

Similarly, the second half 3 includes a second inner pipe 31 and a second outer pipe 32. The second outer pipe 32 accommodates the second inner pipe 31 therein. The second conduit pipe 15 is joined, for example by welding, to the proximal end of the second inner pipe 31 (i.e., the opposite end from the first half 2). The second accommodating pipe 16 is joined, for example by welding, to the proximal end of the second outer pipe 32. A second vacuum space 33 is formed between the second inner pipe 31 and the second outer pipe 32. It should be noted that the position of the proximal end of the second inner pipe 31 and the position of the proximal end of the second outer pipe 32 may be shifted from each other in the axial direction.

The first half 2 further includes a cylindrical holder 25, which holds the first outer pipe 22 via bearings 26, such that the first outer pipe 22 is rotatable. Meanwhile, an outer flange 35 expanding outward in the radial direction is provided at the distal end of the second outer pipe 32 of the second half 3 (i.e., the end facing the first half 2). The outer flange 35 is fastened to the holder 25 by bolts 91. That is, the holder 25 is provided with screw holes in which the bolts 91 are screwed. Alternatively, instead of the screw holes, the holder 25 may be provided with insertion holes intended for the bolts 91, and in this case, nuts may be used.

A first flange 24 expanding outward in the radial direction is provided at the distal end of the first inner pipe 21 (i.e., the end facing the second half 3). A second flange 34 expanding outward in the radial direction is provided at the distal end of the second inner pipe 31.

The first outer pipe 22 and the second outer pipe 32 expand in diameter, except at their proximal end portions. It should be noted that the second outer pipe 32 expands in diameter to a greater degree than the first outer pipe 22, such that the internal diameter of the distal end portion of the second outer pipe 32 is substantially the same as the internal diameter of the holder 25.

An annular first blocking member 41 blocks between the first inner pipe 21 and the first outer pipe 22. In the present embodiment, the first blocking member 41 is located at a position deeper than the distal end surface of the first flange 24 and the distal end surface of the holder 25. Further, in the present embodiment, the inner end portion of the first blocking member 41 is joined to the proximal end surface of the first flange 24, and the outer end portion of the first blocking member 41 is joined to the inner circumferential surface of the first outer pipe 22 at a position that is slightly shifted from the distal end of the first outer pipe 22 toward the proximal end of the first outer pipe 22.

The first blocking member 41 includes at least one annular groove 42, which is recessed into the first vacuum space 23 along the first inner pipe 21. It should be noted that, desirably, a plurality of concentric annular grooves 42 are provided such that the first blocking member 41 is bellows-shaped when seen in a cross-sectional view. In the present embodiment, the first blocking member 41 includes two concentric annular grooves 42.

The space between the first blocking member 41 and the first inner pipe 21, the space between the first blocking member 41 and the first outer pipe 22, and the space between the annular grooves 42 of the first blocking member 41 are part of the aforementioned first vacuum space 23. On the other hand, as described below, the inside of the annular grooves 42 is filled with helium gas. In this manner, vacuum layers and helium gas layers are alternately formed by the first blocking member 41 in the radial direction.

Similarly, an annular second blocking member 43 blocks between the second inner pipe 31 and the second outer pipe 32. In the present embodiment, the second blocking member 43 is located at a position deeper than the distal end surface of the second flange 34 and the distal end surface of the outer flange 35. Further, in the present embodiment, the inner end portion of the second blocking member 43 is joined to the proximal end surface of the second flange 34, and the outer end portion of the second blocking member 43 is joined to the inner circumferential surface of the second outer pipe 32 at a position that is slightly shifted from the distal end of the second outer pipe 32 toward the proximal end of the second outer pipe 32.

The second blocking member 43 includes at least one annular groove 44, which is recessed into the second vacuum space 33 along the second inner pipe 31. It should be noted that, desirably, a plurality of concentric annular grooves 44 are provided such that the second blocking member 43 is bellows-shaped when seen in a sectional view. In the present embodiment, the second blocking member 43 includes three concentric annular grooves 44.

The space between the second blocking member 43 and the second inner pipe 31, the space between the second blocking member 43 and the second outer pipe 32, and the spaces between the annular grooves 44 of the second blocking member 43 are part of the aforementioned second vacuum space 33. On the other hand, as described below, the inside of the annular grooves 44 is filled with helium gas. In this manner, vacuum layers and helium gas layers are alternately formed by the second blocking member 43 in the radial direction.

Further, in the present embodiment, the second half 3 is configured to electrically insulate the first vacuum double pipe 11 and the second vacuum double pipe 14 from each other. Specifically, the second half 3 includes: an annular inner spacer 61 and an annular inner insulator 51, which are interposed between the first flange 24 and the second flange 34; and an annular outer spacer 62 and an annular outer insulator 52, which are interposed between the holder 25 and the outer flange 35.

The inner insulator 51 is sandwiched between the second flange 34 and the inner spacer 61. In the present embodiment, the inner spacer 61 forms a sliding surface 3a. That is, the distal end surface of the inner spacer 61 is the sliding surface 3a facing the first flange 24. The inner spacer 61 is fastened to the second flange 34 by bolts 92. The inner insulator 51 is provided with insertion holes for the bolts 92.

The outer insulator 52 is sandwiched between the outer flange 35 and the outer spacer 62. The outer insulator 52 and the outer spacer 62 are provided with insertion holes for the aforementioned bolts 91.

The thickness of the inner insulator 51 is the same as the thickness of the outer insulator 52, and a gap is formed between the inner insulator 51 and the outer insulator 52. Similarly, the thickness of the inner spacer 61 is the same as the thickness of the outer spacer 62, and a gap is formed between the inner spacer 61 and the outer spacer 62. However, the inner insulator 51 and the outer insulator 52 may have different thicknesses from each other, and the inner spacer 61 and the outer spacer 62 may have different thicknesses from each other. Each of the inner insulator 51 and the outer insulator 52 is made of an insulating material (e.g., a resin such as commodity plastic or engineering plastic). Each of the inner spacer 61 and the outer spacer 62 is made of a metal.

An inner sealing member 71 and an outer sealing member 72 for preventing the liquefied hydrogen from leaking through a gap between the first flange 24 and the inner spacer 61 (sliding surface 3a) are disposed between the first flange 24 and the inner spacer 61 (sliding surface 3a).

In the present embodiment, both the inner sealing member 71 and the outer sealing member 72 are held by the first flange 24. Alternatively, one of or both the inner sealing member 71 and the outer sealing member 72 may be held by the inner spacer 61.

A slight clearance is formed between the first flange 24 and the inner spacer 61, and the inner sealing member 71 and the outer sealing member 72 held by the first flange 24 slide on the inner spacer 61. In the present embodiment, a ring 46 is fitted to the distal end of the first inner pipe 21, such that the ring 46 obscures the inner sealing member 71 from the inside.

Sealing members 73 for preventing the liquefied hydrogen from leaking through a gap between the inner spacer 61 and the inner insulator 51 are disposed between the inner spacer 61 and the inner insulator 51, and sealing members 74 for preventing the liquefied hydrogen from leaking through a gap between the inner insulator 51 and the second flange 34 are disposed between the inner insulator 51 and the second flange 34.

A gap between the inner spacer 61 and the outer spacer 62, and a gap between the inner insulator 51 and the outer insulator 52, communicate with a space between the distal end of the first inner pipe 21 and the distal end of the first outer pipe 22, the space having the first blocking member 41 as its bottom, and a space between the distal end of the second inner pipe 31 and the distal end of the second outer pipe 32, the space having the second blocking member 43 as its bottom. These gaps and spaces constitute a gas space 45. In other words, the gas space 45 is formed between the first blocking member 41 and the second blocking member 43.

The gas space 45 is filled with helium gas. Port members 27 for supplying the helium gas to the gas space 45 through a gap between the first outer pipe 22 and the holder 25 are mounted to the holder 25.

A sealing member 75 for preventing the entry of outside water is disposed between the first outer pipe 22 and the holder 25. Sealing members 76 to 78 for preventing hydrogen gas from leaking to the outside are disposed between the holder 25, the outer spacer 62, the outer insulator 52, and the outer flange 35 so that the hydrogen gas will be prevented from leaking to the outside even when the liquefied hydrogen has leaked into the gas space 45 beyond the sealing members 71 to 74. These sealing members 75 to 78 also serve to prevent the helium gas from leaking to the outside.

The aforementioned bolts 91, which fasten the outer flange 35 to the holder 25, are made of a metal. Accordingly, sleeves 93 made of an insulating material are inserted in the aforementioned insertion holes for the bolts 91, the insertion holes being provided in the outer insulator 52 and the outer spacer 62. Seats 94 made of an insulating material are disposed between the outer flange 35 and washers 95, which contact the heads of the respective bolts 91.

On the other hand, the aforementioned bolts 92, which fasten the inner spacer 61 to the second flange 34, are made of an insulating material. Alternatively, the bolts 92 may be made of a metal, and the same insulation measures as those adopted for the bolts 91 may be adopted for the bolts 92.

The present embodiment further adopts a configuration for discharging, to the outside, a leaked fluid present between the inner sealing member 71 and the outer sealing member 72 at the sliding part between the first flange 24 and the inner spacer 61 (sliding surface 3*a*). The leaked fluid is either the liquefied hydrogen that has leaked beyond the inner sealing member 71 or hydrogen gas that results from evaporation of the liquefied hydrogen that has leaked beyond the inner sealing member 71.

Specifically, as shown in FIG. 2, the inner spacer 61 is provided with an introduction passage 63; the inner insulator 51 is provided with a through-hole 53; and the second flange 34 is provided with an inner passage 36. The outer flange 35 is provided with an outer passage 37. Between the second flange 34 and the outer flange 35, the inner passage 36 and the outer passage 37 are connected by a leakage pipe 8. The leakage pipe 8 is disposed in the gas space 45.

The introduction passage 63 provided in the inner spacer 61 is open at the sliding surface 3*a* between the inner sealing member 71 and the outer sealing member 72, and extends from the sliding surface 3*a* in the axial direction of the second inner pipe 31. Specifically, the introduction passage 63 leads the leaked fluid, which has leaked beyond the inner sealing member 71, from between the inner sealing member 71 and the outer sealing member 72 to the proximal end surface of the inner spacer 61. The through-hole 53 provided in the inner insulator 51 communicates with the introduction passage 63.

The inner passage 36 provided in the second flange 34 communicates with the through-hole 53, and leads the leaked fluid to the outer circumferential surface of the second flange 34. To be more specific, the inner passage 36 extends from the distal end surface of the second flange 34 in the axial direction of the second inner pipe 31, and then bends by 90 degrees toward the outer circumferential surface of the second flange 34. In the present embodiment, as shown in FIG. 4, the outer circumferential surface of the second flange 34 is provided with a recess 34*a*, and the downstream end of the inner passage 36 is open at the bottom of the recess 34*a*.

The outer passage 37 leads the leaked fluid from the inner side to the outer side of the second outer pipe 32. The upstream end of the outer passage 37 is open at the inner circumferential surface of the outer flange 35, and the downstream end of the outer passage 37 is open at the outer circumferential surface of the outer flange 35. Alternatively, the downstream end of the outer passage 37 may be open at the proximal end surface of the outer flange 35. An unshown discharge pipe is connected to the downstream end of the outer passage 37.

Figure 4:
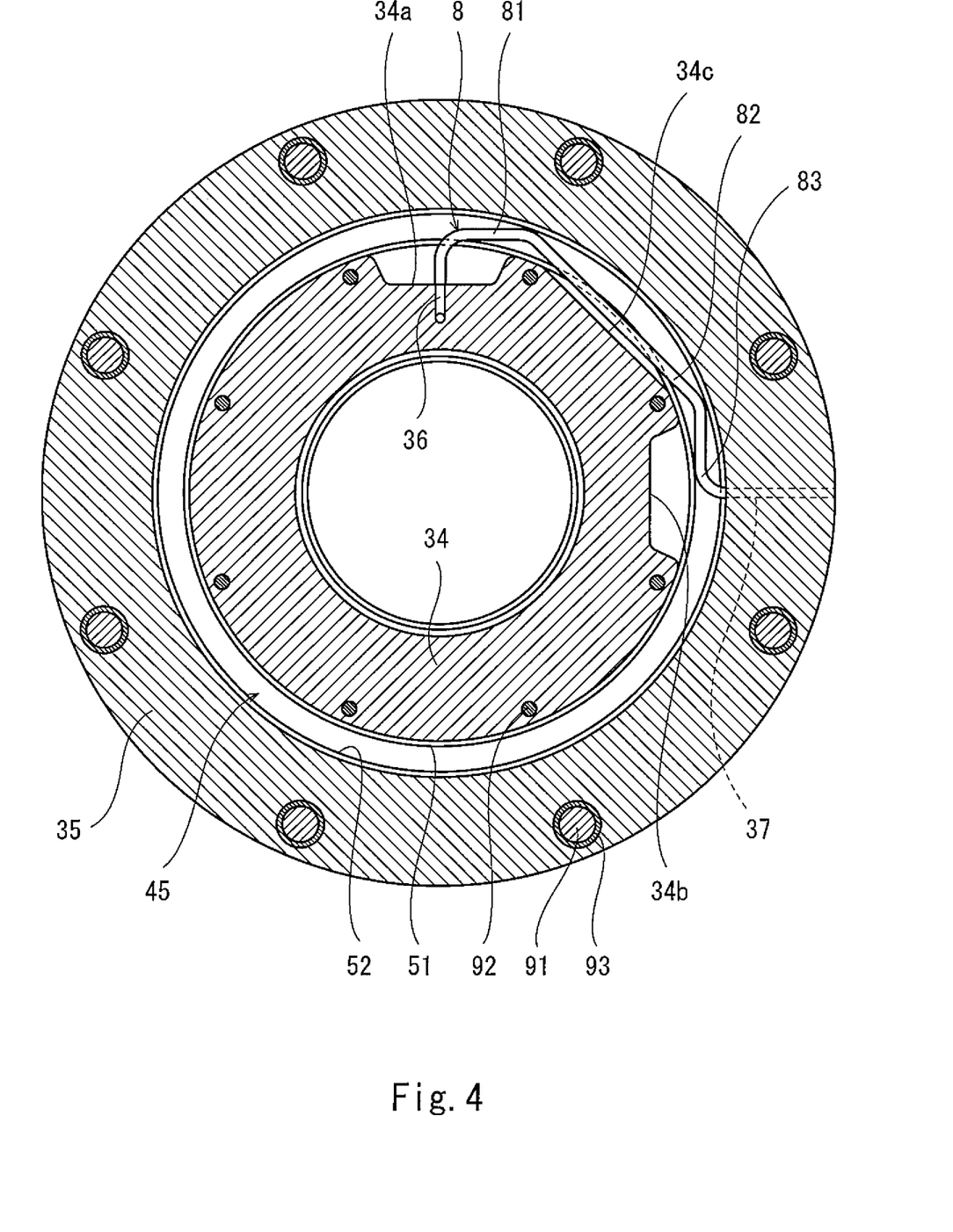
FIG. 4 is a sectional view taken along line IV-IV of FIG. 1.

As shown in FIG. 4, in the present embodiment, the outer passage 37 is located at a position that is different from the position of the inner passage 36 in the circumferential direction. Specifically, in the circumferential direction, the outer passage 37 is located at a position that is shifted from the inner passage 36 by 90 degrees. Further, in the present embodiment, as shown in FIG. 2, the position of the outer passage 37 is different from the position of the inner passage 36 also in the axial direction of the second inner pipe 31. The leakage pipe 8 connects the inner passage 36 and the outer passage 37 while bending.

Desirably, the leakage pipe 8 includes at least one L-shaped portion. In the present embodiment, the leakage pipe 8 includes: a first L-shaped portion 81 connected to the second flange 34; a second L-shaped portion 83 connected to the outer flange 35; and a straight transition portion 82 positioned between the first L-shaped portion 81 and the second L-shaped portion 83.

The first L-shaped portion 81 includes a first bend portion that bends by 90 degrees between two straight portions. A portion that connects the first L-shaped portion 81 and the transition portion 82 is a second bend portion that bends by about 45 degrees. A portion that connects the transition portion 82 and the second L-shaped portion 83 is a third bend portion that bends by about 45 degrees. The second L-shaped portion 83 includes a fourth bend portion that bends by 90 degrees between two straight portions.

In the present embodiment, as shown in FIG. 4, the outer circumferential surface of the second flange 34 is provided also with a recess 34*b* at a position corresponding to the outer passage 37. The outer circumferential surface of the second flange 34 is provided with a cutout 34*c* between the recess 34*a* and the recess 34*b* in order to avoid interference with the transition portion 82.

As described above, in the fluid loading joint 1 of the present embodiment, the discharge route of the leaked fluid is formed in the fixed-side second half 3. This makes it possible to simplify the structure of the movable-side first half 2, which incorporates the bearings 26 therein.

In the present embodiment, the fluid flowing through the inside of the first inner pipe 21 and the second inner pipe 31 is liquefied hydrogen having an extremely low temperature. In this respect, in the present embodiment, since the leakage pipe 8 includes the bend portions, thermal contraction of the second inner pipe 31 can be absorbed by bending deformation occurring at the bend portions.

Further, in the present embodiment, the second half 3 includes the inner spacer 61, which is provided with the introduction passage 63, and the inner insulator 51, which is provided with the through-hole 53. This makes it possible to electrically insulate between the first flange 24 and the second flange 34.

(Variations)

The present invention is not limited to the above-described embodiments. Various modifications can be made without departing from the scope of the present invention.

For example, the outer spacer 62 may be eliminated, and either one of the first outer pipe 22 or the second outer pipe 32 may be made longer by a length corresponding to the thickness of the outer spacer 62.

Alternatively, if it is unnecessary to electrically insulate the first vacuum double pipe 11 and the second vacuum double pipe 14 from each other, the inner and outer spacers 61 and 62 as well as the inner and outer insulators 51 and 52 may be eliminated, and the distal end surface of the second flange 34 may serve as the sliding surface 3*a*.

The gas that fills the gas space 45 can be suitably selected (e.g., nitrogen gas) in accordance with the low-temperature fluid for which the fluid loading joint 1 is intended. The fluid loading joint 1 does not necessarily connect vacuum double pipes to each other, but may connect other types of double pipes to each other.

REFERENCE SIGNS LIST

1 fluid loading joint
2 first half
21 first inner pipe
22 first outer pipe
23 first vacuum space
24 first flange
25 holder 3 second half
31 second inner pipe
32 second outer pipe
33 second vacuum space
34 second flange
35 outer flange
36 inner passage
37 outer passage
41 first blocking member
42 annular groove
43 second blocking member
44 annular groove
45 gas space
51 inner insulator
53 through-hole
61 inner spacer
63 introduction passage
71 inner sealing member
72 outer sealing member
8 leakage pipe

The invention claimed is:

1. A fluid loading joint for rotatably connecting double pipes to each other, the fluid loading joint comprising:
   a first half including a first inner pipe, a first outer pipe, and a holder, the first inner pipe being provided with a first flange, the first outer pipe accommodating the first inner pipe therein, the holder holding the first outer pipe such that the first outer pipe is rotatable;
   a second half including a sliding surface facing the first flange, the second half including a second inner pipe and a second outer pipe, the second inner pipe being provided with a second flange, the second outer pipe accommodating the second inner pipe therein and being provided with an outer flange that is fastened to the holder;
   an inner sealing member and an outer sealing member that are disposed between the first flange and the sliding surface;
   an inner passage provided in the second flange, the inner passage leading a leaked fluid from between the inner sealing member and the outer sealing member to an outer circumferential surface of the second flange;
   an outer passage provided in the outer flange, the outer passage leading the leaked fluid from an inner side to an outer side of the second outer pipe; and
   a leakage pipe that connects the inner passage and the outer passage between the second flange and the outer flange, wherein
   the outer passage is located at a position that is different from a position of the inner passage in a circumferential direction, and
   the leakage pipe connects the inner passage and the outer passage while bending.

2. The fluid loading joint according to claim 1, wherein the first half includes a first blocking member that blocks between the first inner pipe and the first outer pipe,
   the second half includes a second blocking member that blocks between the second inner pipe and the second outer pipe, the second blocking member forming a gas space between the first blocking member and the second blocking member, the gas space being filled with gas, and
   the leakage pipe is disposed in the gas space.

3. The fluid loading joint according to claim 2, wherein the second half includes:
   an annular spacer interposed between the first flange and the second flange and forming the sliding surface; and
   an annular insulator sandwiched between the spacer and the second flange,
   the insulator is provided with a through-hole that communicates with the inner passage, and
   the spacer is provided with an introduction passage that is open at the sliding surface between the inner sealing member and the outer sealing member, the introduction passage communicating with the through-hole.

4. A fluid loading joint for rotatably connecting double pipes to each other, the fluid loading joint comprising:
   a first half including a first inner pipe, a first outer pipe, and a holder, the first inner pipe being provided with a first flange, the first outer pipe accommodating the first inner pipe therein, the holder holding the first outer pipe such that the first outer pipe is rotatable;
   a second half including a sliding surface facing the first flange, the second half including a second inner pipe and a second outer pipe, the second inner pipe being provided with a second flange, the second outer pipe accommodating the second inner pipe therein and being provided with an outer flange that is fastened to the holder;
   an inner sealing member and an outer sealing member that are disposed between the first flange and the sliding surface;
   an inner passage provided in the second flange, the inner passage leading a leaked fluid from between the inner sealing member and the outer sealing member to an outer circumferential surface of the second flange;
   an outer passage provided in the outer flange, the outer passage leading the leaked fluid from an inner side to an outer side of the second outer pipe; and
   a leakage pipe that connects the inner passage and the outer passage between the second flange and the outer flange, wherein
   the second half includes:
   an annular spacer interposed between the first flange and the second flange and forming the sliding surface; and
   an annular insulator sandwiched between the spacer and the second flange,
   the insulator is provided with a through-hole that communicates with the inner passage, and
   the spacer is provided with an introduction passage that is open at the sliding surface between the inner sealing member and the outer sealing member, the introduction passage communicating with the through-hole.

* * * * *